United States Patent [19]
Mertens et al.

[11] Patent Number: 5,192,102
[45] Date of Patent: Mar. 9, 1993

[54] BASIC FRAME ARRANGED ON THE CARRYING CHASSIS OF A TRUCK

[75] Inventors: Armin Mertens, Munich; Peter Hinze, Altomünster Randelsried; Rudolf Ebert, Karlsfeld; Herbert Grach, Unterschleissheim, all of Fed. Rep. of Germany

[73] Assignees: MAN Nutzfahrzeuge Aktiengesellschaft; Siemens Aktiengesellschaft, both of Munich, Fed. Rep. of Germany

[21] Appl. No.: 792,817

[22] Filed: Nov. 15, 1991

[30] Foreign Application Priority Data

Dec. 17, 1990 [DE] Fed. Rep. of Germany ....... 4040267

[51] Int. Cl.$^5$ .............................................. B60S 9/12
[52] U.S. Cl. ................................ 280/766.1; 200/61.44
[58] Field of Search .............. 280/766.1, 765.1, 663.1; 212/189; 200/61.44

[56] References Cited

U.S. PATENT DOCUMENTS

| 3,768,088 | 10/1973 | Risius | 200/61.44 |
| 4,084,777 | 4/1978 | Lambert | 212/189 |
| 4,593,932 | 6/1986 | Miyazawa | 280/765.1 |

FOREIGN PATENT DOCUMENTS 0012449  1/1987  Japan ................................ 280/766.1

Primary Examiner—David M. Mitchell
Attorney, Agent, or Firm—Robert W. Becker & Associates

[57] ABSTRACT

A basic frame which may be arranged on the carrying chassis of a truck is provided. The basic frame, which is not described in detail, has a hollow beam and struts with supports at their ends that slide in the hollow beam. When the struts are extended the supports may be lowered to the ground so that military equipment such as a rocket launcher or signaling devices mounted on the basic frame, may project to the side without the truck being likely to topple over.

6 Claims, 4 Drawing Sheets

BASIC FRAME ARRANGED ON THE CARRYING CHASSIS OF A TRUCK

BACKGROUND OF THE INVENTION

The invention relates to a basic frame on the carrying chassis of a truck for receiving units changeable in their orientation and extendable in a plurality of directions, especially for military applications, which has struts extendable in the direction of width and has supports arranged at the end thereof that are vertically lowerable, whereby the extendable struts, which are guided in a transverse hollow beam that is part of the basic frame, are telescopically movable in the longitudinal direction into a desired extended position by a signal transmitted by a control device.

Basic frames equipped with a position detecting system using limit or proximity switches have been proposed, but they do not operate reliably in the presence of electromagnetic radiation. It is however an essential requirement that weapons and signaling devices mounted on a basic frame be fully operational in all circumstances. Even the arrangement of common electromechanical switches is problematic, if such switches are permanently associated with the hollow part of the telescopic structure; the point of switching or detection may be so shifted by the substantial inaccuracies in manufacture of the telescopic frame, which is made up of welded tubes, that the point of switching is no longer accurate.

It is therefore an object of the present invention to provide a reliable detecting or switching means which is not subject to interference in order to ascertain the end position of the telescopically extendable struts with their terminally mounted supports.

SUMMARY OF THE INVENTION

This is to be achieved in the present invention by providing electromechanical switches that are arranged on the hollow beam, such switches having switch feelers extending through the wall of the hollow beams and being adapted to act upon the switches in response to switch actuating recesses in the telescopic struts in a manner independent of inaccuracies in manufacture (play) between the hollow beam and the telescoping struts. The switch is provided with a floating switch feeler and a floating leveling feeler which are movable independent from each other. When in this design the switch actuating recess or groove is in a position underneath the moving switch feeler, the switch feeler drops into the recess or groove, while the leveling feeler continues to ride over the outer, grooveless surface of the strut. Therefore the switch feeler will always move the distance a (see FIG. 4) independently of the inaccuracies of manufacture (play) between the struts and the hollow beam.

In one particular design in accordance with the invention the housing of the switch is fixedly connected to the leveling feeler and the switch element of the switch is fixedly connected to the switch feeler. The leveling feeler, which is in the form of a tube, is arranged in a bearing housing that is fixedly connected to the hollow beam so that the leveling feeler may slide in its longitudinal direction inside the bearing housing. Between a sliding shoe that is fixed to the lower end of the leveling feeler and the lower edge of the bearing housing a compression spring is arranged. Between an abutment at the switch feeler, which at its free end carries a follower roller, and a bearing bushing, which is provided inside the bore of the tubular leveling feeler, a compression spring is arranged. The bearing bushing is fixedly connected to the leveling feeler and surrounds the switch feeler so that the bearing bushing and the switch feeler are slidable relative to one another. This ensures that the entire switch is arranged floatingly in its direction of actuation in relation to the extendable telescopic struts and the stationary hollow beam of the strut system so that assembly and manufacturing inaccuracies (play) between the elements of the strut system that are sliding relative to one another do not effect the actuating distance (travel) of the switch.

In accordance with a further possible embodiment of the invention the switch and its switching element, which at its end bears a follower roller, are arranged perpendicularly in relation to the switch feeler. At the upper end of the switch feeler there is a slanted surface, which the follower roller of the switch element contacts. Furthermore, at its upper end, the leveling feeler has a slot-like opening, approximately as long as the plane of the slanted surface of the switch feeler, to allow the follower roller to penetrate. The upper end of the leveling feeler is connected to the switch by means of a angle piece made of sheet metal. In this manner an especially flat configuration of the detecting or switching means is achieved.

BRIEF DESCRIPTION OF THE DRAWINGS

Two embodiments of the invention will now be described with reference to the accompanying drawings, in which.

DESCRIPTION OF PREFERRED EMBODIMENTS

Figure 1:
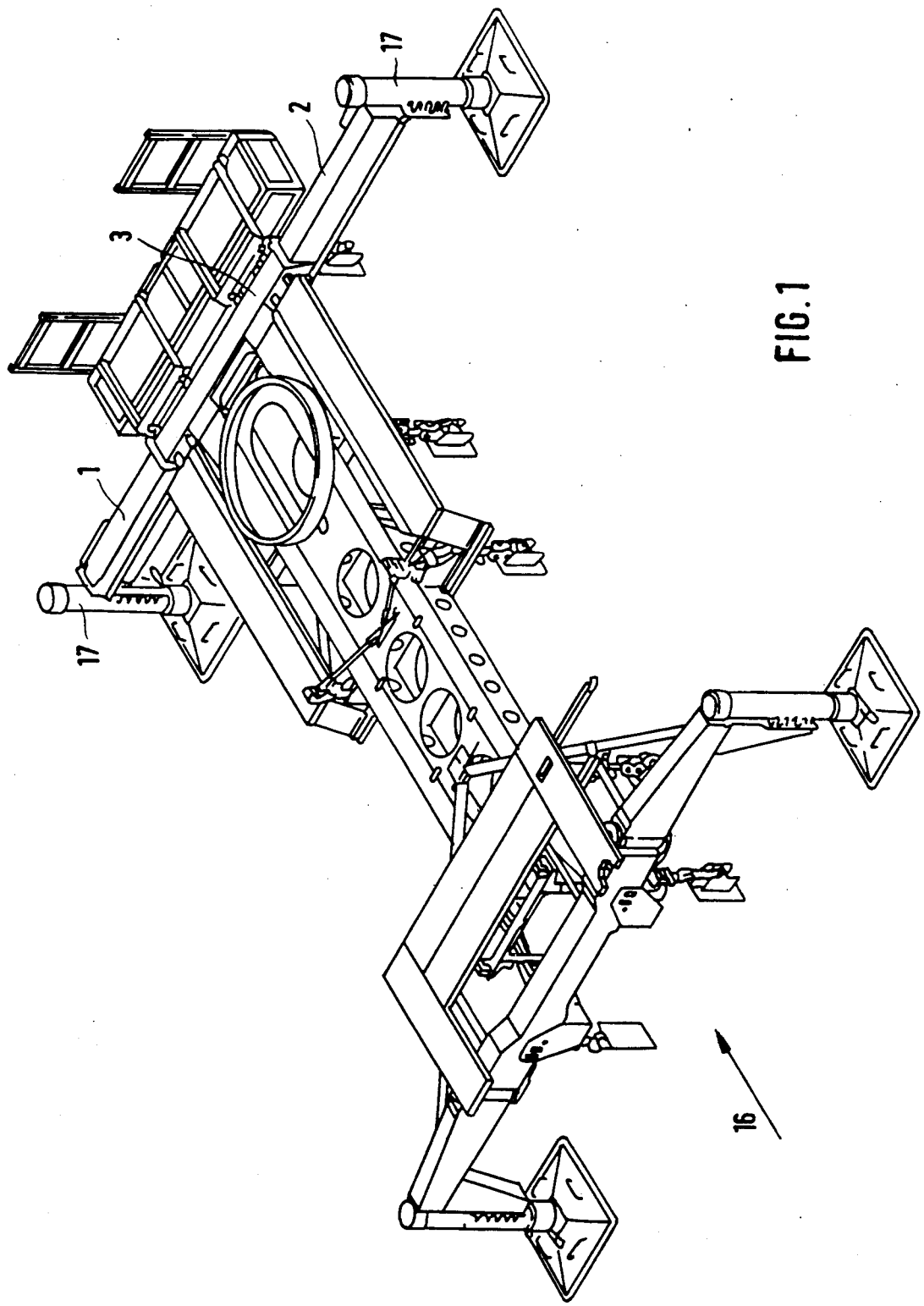
FIG. 1 is a perspective view of a basic frame for mounting on the carrying chassis of the truck.

FIG. 1 shows a basic frame 16 mountable on the carrying chassis of a truck. The basic frame 16 which is not described in detail has telescopic structures comprising hollow beams 3 in which struts 1 and 2 are arranged for a telescopic movement and, when the telescopic struts 1, 2 are extended, supports 17 permanently mounted on the ends of the struts 1,7 may be lowered to the ground so that military equipment such as a rocket launcher or signaling equipment mounted on the basic frame may project to the side without the truck being likely to topple over.

Figure 2:
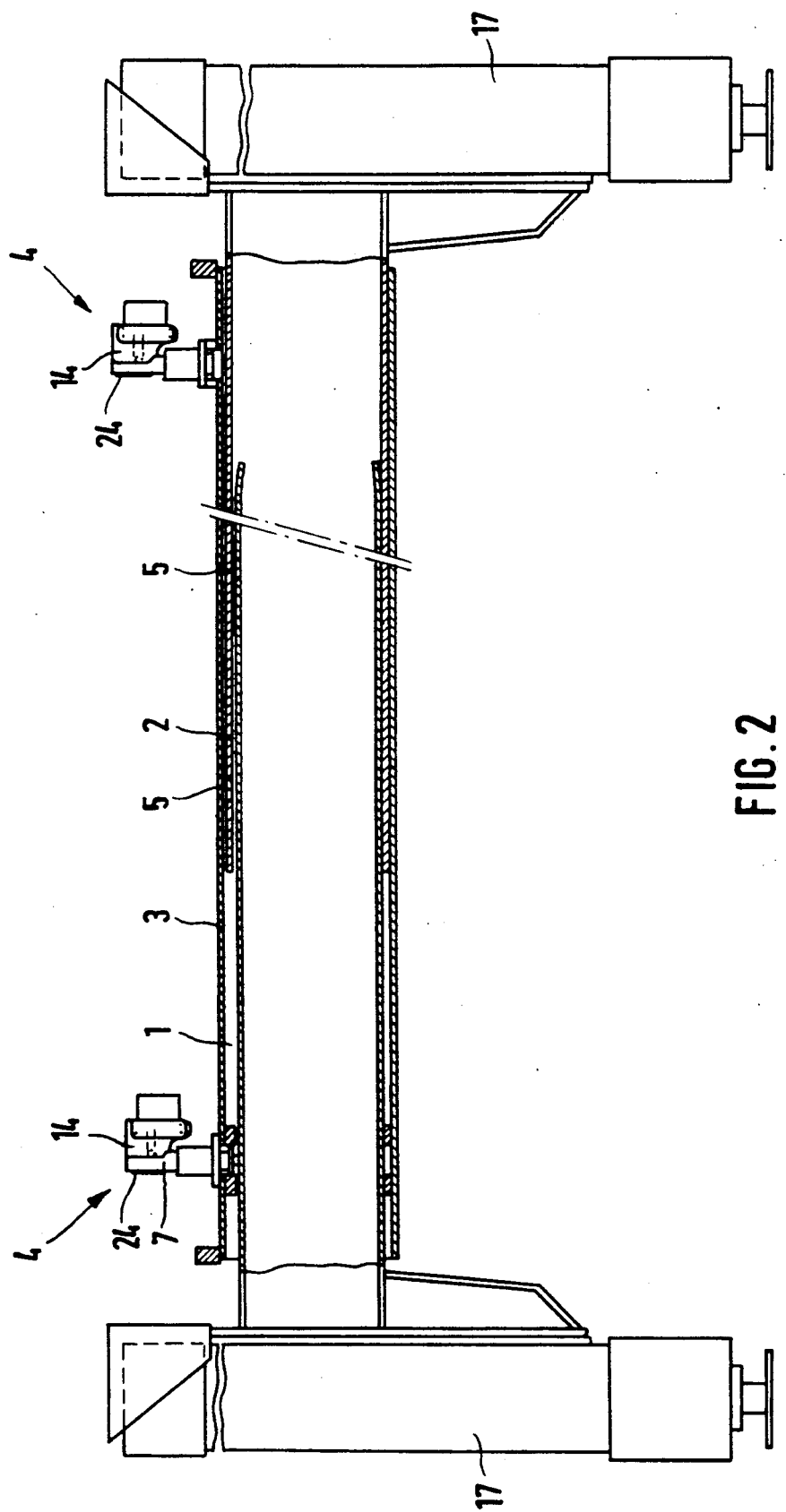
FIG. 2 shows the extending telescopic unit, associated with the basic frame, including the switching means.

FIG. 2 shows the telescopic unit with outer hollow beam 3 in which the struts 1 and 2 with the terminally mounted vertical supports 17 are arranged. The supports 17, when necessary, may be lowered to the ground. On both sides of the hollow beam 3 a respective detecting or switching means 4 is arranged. The same consists of a switch 14 and a leveling feeler 7, which are connected together by an angle member 24 made of sheet metal. In the outer part of the struts 1, 2 recesses or switch actuating grooves 5 are arranged.

Figure 3:
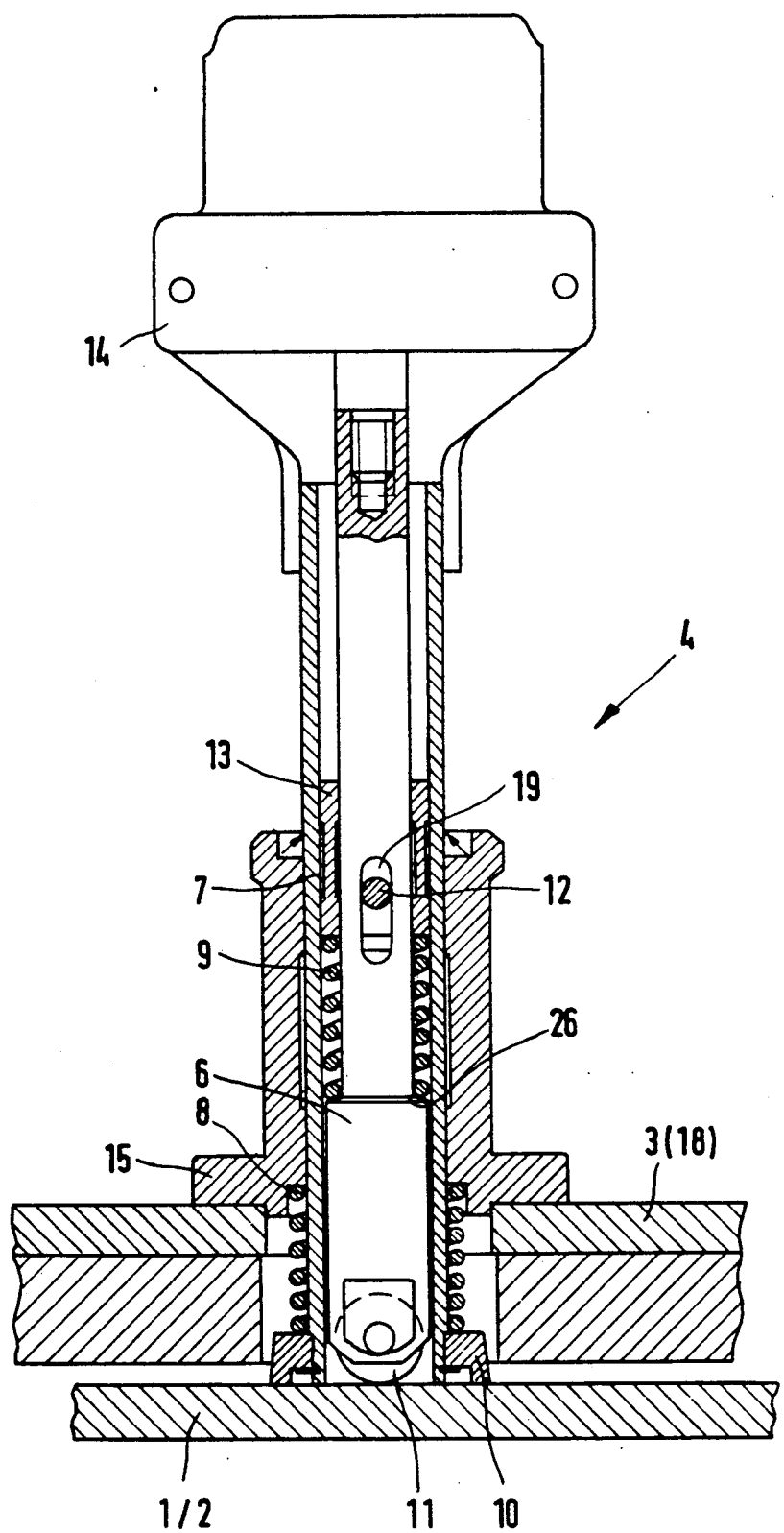
FIG. 3 shows a switching means in section.

FIG. 3 shows a switching means 4 in a cross-sectional view. The housing of the switch 14 is fixedly connected to a leveling feeler 7. The leveling feeler 7 is arranged to slide in a bearing housing 15 which is permanently connected to the stationary hollow beam 3. At the lower end of the leveling feeler 7 a sliding shoe 10 is secured, which bears against the outer wall of the respective moving strut 1 or 2. Between the sliding shoe 10 and the lower edge of the bearing housing 15 there is a compression spring 8 which is mounted with a compression bias or load. A switch feeler 6 is fixedly connected to the switch element of the switch 14. At its lower end the switch feeler 6 has a follower roller 11, which bears against the outer wall of the struts 1 and 2. The switch feeler 6 extends through the interior of the tubular leveling feeler 7. The switch feeler 6 is guided in the bearing bushing 13, which via a pin 12 is permanently connected to the leveling feeler 7. It is possible for the pin 12 to slide in a slot 19 within the switch feeler 6. Between an abutment 26 of the switch feeler 6 and the lower edge of the bearing bushing 13 there is a compression spring 9 mounted which is inserted so as to be under a preload.

Figures 4, 5:
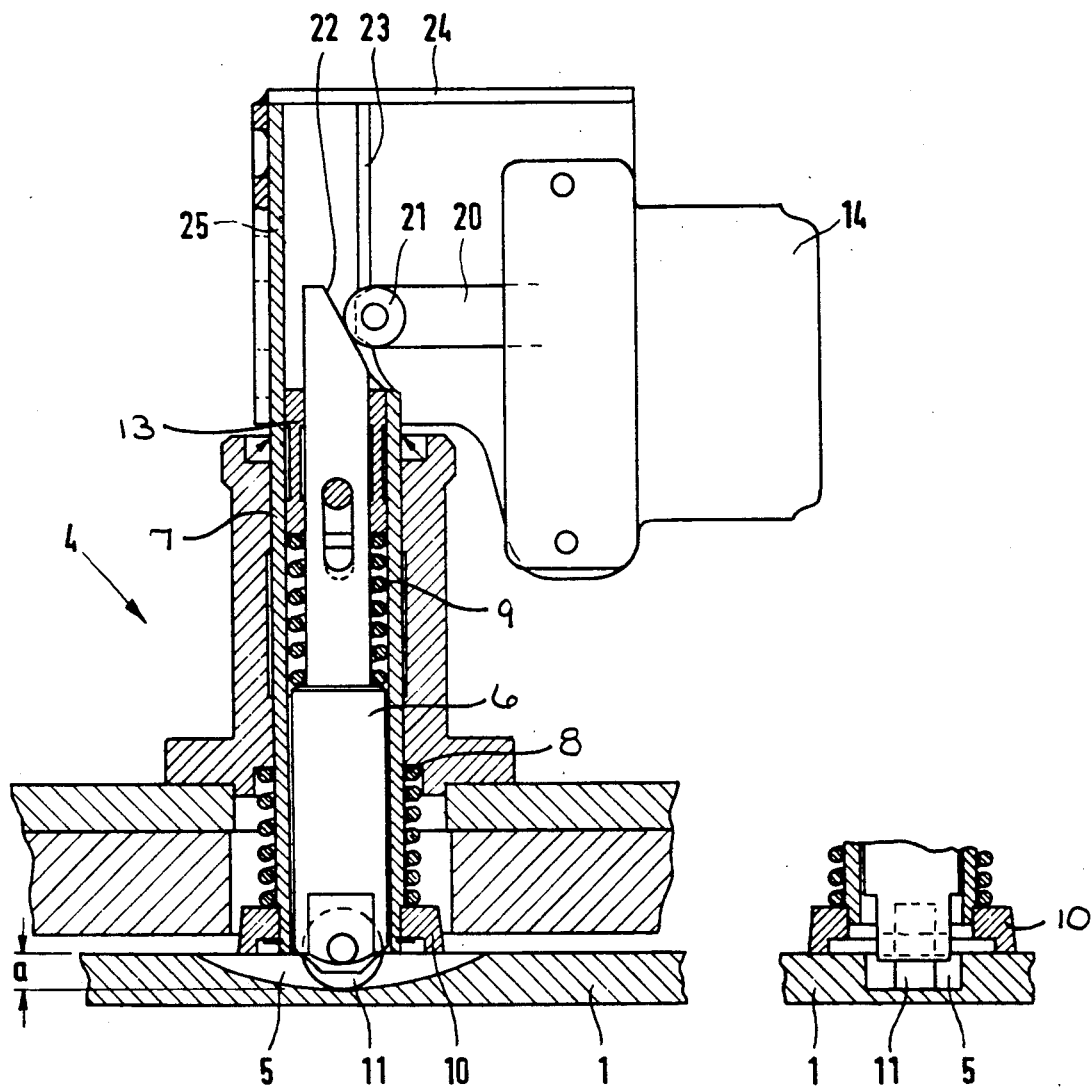
FIG. 4 shows a further possible embodiment of the switching means in accordance with FIG. 3 in a cross-sectional view.
FIG. 5 shows part of the structure of FIG. 4 in a cross-sectional view along the center line of the switch feeler.

FIG. 4 shows a further possible configuration of the switching means in accordance with FIG. 3. In this case the switch element 20 of the switch 14 has a follower roller 21 at its end, which contacts a slanted surface 22 on the upper end of the switch feeler 6. The roller 21 may penetrate through a slot-like opening provided in the upper part 25 of the leveling feeler 7 in order to contact the slanted surface 22. The upper part 25 of the leveling feeler 7 is permanently connected with the switch 14 by means of an angle piece 24. As shown in FIG. 4 the switch feeler 6 with the follower roller 11 may move into the recess or switch activating groove 5 and thus produce a signal.

FIG. 5 shows the contact point in a cross-sectional side view. It can be seen that the sliding shoe 10 is still riding on the outer wall surface of the strut 1, while the follower roller 11 associated with the switch feeler 6 is positioned in the recess 5. Therefore only the difference in depth due to the recess 5 is relevant for the generation of a switching signal; any inaccuracies or tolerances (play) between the hollow beam 3 and the struts 1, 2 are of no account.

What we claim is:

1. A basic frame on the carrying chassis of a truck for receiving units changeable in orientation and extendable in a plurality of directions, said basic frame having at least one transverse hollow beam and struts extendable in a direction of width, said struts having supports arranged at a respective end thereof that are vertically lowerable, said extendable struts guided in said hollow beam and telescopically movable in a longitudinal direction thereof into a desired extended position by a signal transmitted by a control device, said basic frame further comprising electromechanical switches arranged on said hollow beam, said switches having respective feelers extending through a wall of said hollow beam and said struts having recesses on a side thereof facing said feelers, said feelers engaging said recesses and acting on said switches in response to a depth of said recesses, so that manufacturing inaccuracies and play between said struts and said hollow beams are without influence, with said respective feelers of a corresponding one of said switches comprising a leveling feeler and a switch feeler that are mounted slidably on said corresponding switch and are movable independent of each other in relation to said hollow beam and said struts.

2. A basic frame as claimed in claim 1, wherein said respective feelers of a corresponding one of said switches comprise a leveling feeler and a switch feeler that are mounted floatingly on said corresponding switch and are movable independent of each other in relation to said hollow beam and said struts.

3. A basic frame on the carrying chassis of a truck for receiving units changeable in orientation and extendable in a plurality of directions, said basic frame having at least one transverse hollow beam and struts extendable in a direction of width, said struts having supports arranged at a respective end thereof that are vertically lowerable, said extendable struts guided in said hollow beam and telescopically movable in a longitudinal direction thereof into a desired extended position by a signal transmitted by a control device, said basic frame further comprising electromechanical switches arranged on said hollow beam, said switches having respective feelers extending through a wall of said hollow beam and said struts having recesses on a side thereof facing feelers, said feelers engaging said recesses and acting on said switches in response to a depth of said recesses, so that manufacturing inaccuracies and play between said struts and said hollow beams are without influence, wherein:

said respective feelers of a corresponding one of said switches comprise a leveling feeler and a switch feeler;

said corresponding switch has a housing that is permanently connected to said leveling feeler, and has a switch element that is permanently connected to said switch feeler;

said leveling feeler is tubular and is guided in a bearing housing fixedly connected to said hollow beam;

a sliding shoe is attached to an end of said leveling feeler in the vicinity of said hollow beam;

a compression spring is arranged between said sliding shoe and a lower edge of said bearing housing;

a rotary roller connected to a free end of said switch feeler;

a bearing bushing is arranged inside said leveling feeler, said bearing bushing being tubular and being permanently connected to said leveling feeler, said bearing bushing surrounding said switch feeler in a slidable manner; and a compression spring is arranged between an abutment of said switch feeler and said bearing bushing.

4. A basic frame as claimed in claim 3, wherein said leveling feeler and said bearing bushing are connected by means of a pin, which is guided in a slot in said switch feeler.

5. A basic frame on the carrying chassis of a truck for receiving units changeable in orientation and extendable in a plurality of directions, said basic frame having at least one transverse hollow beam and struts extendable in a direction of width, said struts having supports arranged at a respective end thereof that are vertically lowerable, said extendable struts guided in said hollow beam and telescopically movable in a longitudinal direction thereof into a desired extended position by a signal transmitted by a control device, said basic frame further comprising electromechanical switches arranged on said hollow beam, said switches having respective feelers extending through a wall of said hollow beam and said struts having recesses on a side thereof facing said feelers, said feelers engaging said recesses and acting on said switches in response to a depth of said recesses, so that manufacturing inaccuracies and play between said struts and said hollow beams are without influence, wherein:

said respective feelers of a corresponding one of said switches comprise a leveling feeler and a switch feeler having a slanted surface at an upper end thereof, said leveling feeler fixedly connected to said corresponding switch and said switch feeler slidably connected inside said leveling feeler, said switch having a respective switch element with a follower roller connected to a free end of said switch element, said switch element arranged transverse relative to said switch feeler and said follower roller contacting said slanted surface.

6. A basic frame as claimed in claim 5, wherein, at an upper end, said leveling feeler has a slot-like opening corresponding approximately to a length of said slanted surface of said switch feeler to allow penetration of said follower roller; said upper end of said leveling feeler being connected by means of an angle piece made of sheet metal to said switch.

* * * * *